United States Patent
Lynch

(10) Patent No.: US 10,142,455 B2
(45) Date of Patent: Nov. 27, 2018

(54) METHOD AND APPARATUS FOR RENDERING GEOGRAPHIC MAPPING INFORMATION

(71) Applicant: HERE GLOBAL B.V., Eindhoven (NL)

(72) Inventor: James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 331 days.

(21) Appl. No.: 13/758,694

(22) Filed: Feb. 4, 2013

(65) Prior Publication Data

US 2014/0223317 A1 Aug. 7, 2014

(51) Int. Cl.
*G06F 3/0485* (2013.01)
*H04M 1/725* (2006.01)

(52) U.S. Cl.
CPC ...... *H04M 1/7253* (2013.01); *H04M 1/72569* (2013.01)

(58) Field of Classification Search
CPC ...... G06F 3/0428; G06F 1/169; G06F 1/1626; G06F 2200/1637; G06F 3/0317; G06F 3/0346; G06F 3/03543
See application file for complete search history.

(56) References Cited

U.S. PATENT DOCUMENTS

| | | | |
|---|---|---|---|
| 2004/0189609 A1* | 9/2004 | Estes et al. | 345/169 |
| 2004/0246229 A1* | 12/2004 | Yamada | G06F 3/0317 345/156 |
| 2006/0136129 A1* | 6/2006 | Yokozawa | G01C 21/3623 701/434 |
| 2009/0137269 A1* | 5/2009 | Chung | 455/556.1 |
| 2011/0294543 A1* | 12/2011 | Lapstun et al. | 455/556.1 |
| 2013/0050077 A1* | 2/2013 | Auvray et al. | 345/157 |
| 2013/0321466 A1* | 12/2013 | Kocienda | G01C 21/26 345/635 |

* cited by examiner

*Primary Examiner* — Namitha Pillai
(74) *Attorney, Agent, or Firm* — Ditthavong & Steiner, P.C.

(57) ABSTRACT

An approach is provided for rendering and maneuvering about large-scale documents with a mobile device that features an integrated optical sensor and virtual display functions. A positioning platform determines mapping information, navigation information, document information, or a combination thereof associated with at least one device. The positioning platform determines one or more interactions, one or more positions, or a combination thereof associated with the at least one device. The positioning platform further causes, at least in part, a rendering of the mapping information, the navigation information, the document information, or a combination thereof in a user interface of the at least one device based, at least in part, on the one or more interactions, the one or more positions, or a combination thereof.

20 Claims, 13 Drawing Sheets

METHOD AND APPARATUS FOR RENDERING GEOGRAPHIC MAPPING INFORMATION

BACKGROUND

Service providers and device manufacturers (e.g., wireless, cellular, etc.) are continually challenged to deliver value and convenience to consumers by, for example, providing compelling network services. With the expanding use of mobile devices (e.g., mobile phones and/or tablets), consumer demand for functionality and services has greatly increased. One area of interest has been the development of methods for virtually displaying large-scale documents (e.g., maps, navigation routes, corporate spreadsheets, etc.) on mobile devices. However, the existing mobile devices or related services are often unable to effectively utilize all relevant technologies. Since most users carry or have easy access to these devices on a daily basis, incorporating an optical sensor can provide users with on demand access to pointing and virtual display functions that may improve user convenience and add value to the devices. Accordingly, service providers and device manufacturers face significant technical challenges in providing a mobile communication device that functions as a pointing device and has virtual display capabilities.

SOME EXAMPLE EMBODIMENTS

Therefore, there is a need for an approach for rendering and maneuvering about large-scale documents with a mobile device that features an integrated optical sensor and virtual display functions.

According to one embodiment, a method comprises determining mapping information, navigation information, document information, or a combination thereof associated with at least one device. The method also comprises determining one or more interactions, one or more positions, or a combination thereof associated with the at least one device. The method further comprises causing, at least in part, a rendering of the mapping information, the navigation information, the document information, or a combination thereof in a user interface of the at least one device based, at least in part, on the one or more interactions, the one or more positions, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine mapping information, navigation information, document information, or a combination thereof associated with at least one device. The apparatus is also caused to determine one or more interactions, one or more positions, or a combination thereof associated with the at least one device. The apparatus is further caused to cause, at least in part, a rendering of the mapping information, the navigation information, the document information, or a combination thereof in a user interface of the at least one device based, at least in part, on the one or more interactions, the one or more positions, or a combination thereof.

According to another embodiment, a computer-readable storage medium carries one or more sequences of one or more instructions which, when executed by one or more processors, cause, at least in part, an apparatus to determine mapping information, navigation information, document information, or a combination thereof associated with at least one device. The apparatus is also caused to determine one or more interactions, one or more positions, or a combination thereof associated with the at least one device. The apparatus is further caused to cause, at least in part, a rendering of the mapping information, the navigation information, the document information, or a combination thereof in a user interface of the at least one device based, at least in part, on the one or more interactions, the one or more positions, or a combination thereof.

According to another embodiment, an apparatus comprises means for determining mapping information, navigation information, document information, or a combination thereof associated with at least one device. The apparatus also comprises means for determining one or more interactions, one or more positions, or a combination thereof associated with the at least one device. The apparatus further comprises means for causing, at least in part, a rendering of the mapping information, the navigation information, the document information, or a combination thereof in a user interface of the at least one device based, at least in part, on the one or more interactions, the one or more positions, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining mapping information, navigation information, document information, or a combination thereof associated with at least one device, and then determining the one or more interactions and/or one or more positions associated with the at least one device, to cause a rendering of the mapping information, the navigation information, the document information, or a combination thereof in a user interface of the at least one device based, at least in part, on the one or more interactions, the one or more positions, or a combination thereof, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
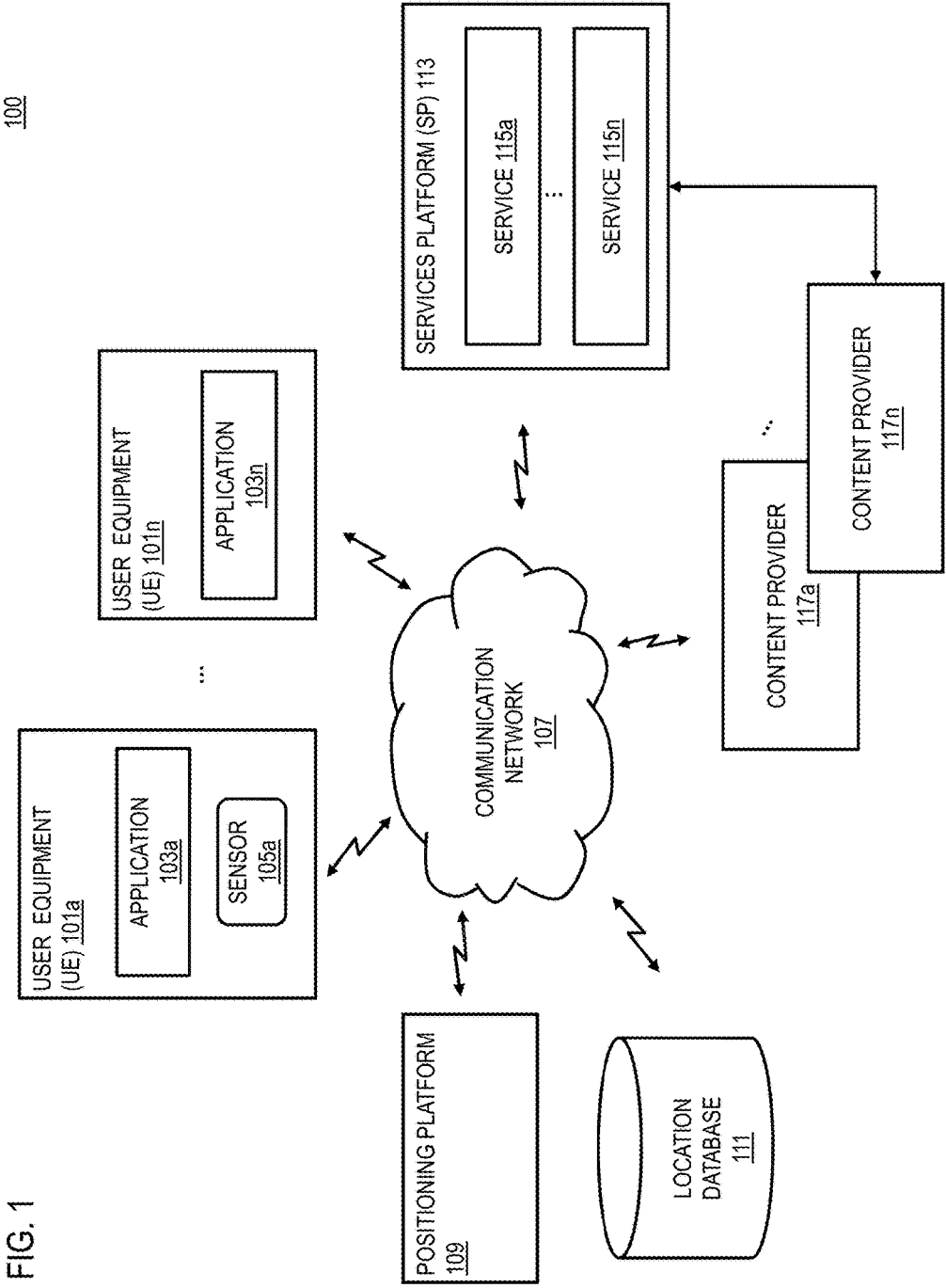
FIG. 1 is a diagram of a system capable of rendering and maneuvering about large-scale documents with a mobile device that features an integrated optical sensor and virtual display functions., according to one embodiment.

FIG. 1 is a diagram of a system capable of rendering and maneuvering about large-scale documents with a mobile device that features an integrated optical sensor and virtual display functions, according to one embodiment. As noted previously, despite increase consumer demand for integrated mobile device and services, there is no coordination between a mobile device (e.g., a mobile phone or a tablet) and other devices that are generally used as an extension for other devices for pointing (e.g., a standard mouse) and virtual display purposes, and thereby forcing users to use multiple devices, which reduces the overall user experience. Moreover, there has not been any development regarding the protocol mechanisms to facilitate the convenient and efficient transfer of data for such purposes. By way of example, sensor-based device events (or sensor events) refer to events that stem from or reflect a change in one or more sensors.

To address this problem, the system 100 of FIG. 1 introduces the capability to rendering and maneuvering about large-scale documents with a mobile device that features an integrated optical sensor and virtual display functions. As shown in FIG. 1, the system 100 comprises user equipment (UE) 101a-101n (e.g., a mobile phone, a tablet, and/or a personal computer) (also collectively referred to as UEs 101) that may include or be associated with applications 103a-103m (collectively referred to as applications 103). By way of example, the applications 103 may be any type of application that may perform various processes and/or functions at the UEs 101. In one embodiment, the applications 103 may be media (e.g., audio, video, images, etc.) player applications, social networking applications, navigational applications, calendar applications, etc. In one embodiment, the applications 103 may generate contextual information regarding the UEs 101, or information that may be processed to determine contextual information associated with the UEs 101. Further, an application 103 may determine location information associated with the UEs 101 that may be processed as contextual information.

In one embodiment, at least one UE 101 (e.g., the UE 101a) includes one or more sensors 105a-105n (also collectively referred to as sensors 105). More specifically, the at least one UE 101 (e.g., the UE 101a) includes an integrated optical sensor. In addition, the sensors 105 may include, for example, a camera/imaging sensor for gathering image data, an audio recorder for gathering audio data, a global positioning system (GPS) receiver for gathering location data, an optical mouse sensor, a position sensor or gyroscope for detecting device orientation and/or tilt, a network detection sensor for detecting wireless signals or network data, temporal information and the like. This information is provided to the positioning platform 109 for processing to determine contextual information associated with the UEs 101.

In one embodiment, the UEs 101 have connectivity to a positioning platform 109 via the communication network 107.

By way of example, the UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the positioning platform 109 may be a platform with multiple interconnected components. The positioning platform 109 may include multiple servers, intelligent networking devices, computing devices, components, and corresponding software. In addition, it is noted that the positioning platform 109 may be a separate entity of the system 100, a part of the one or more services 115*a*-115*n* (also collectively referred to as services 115) of the services platform 113, or included within the UEs 101 (e.g., as part of the applications 103). By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the positioning platform 109 with occurrence information of the one or more location information.

In one embodiment, the positioning platform 109 may cause a configuration of at least one UE 101 (e.g., the UE 101*a*) as a pointing device, a display device, or a combination thereof. The positioning platform 109 may then determine an event corresponding to one or more sensors 105 of the UEs 101 (e.g., a panning motion detected by the integrated optical sensor). As a result, the positioning platform 109 may cause, at least in part, a mapping of at least one UE 101 (e.g., the UE 101*a*) to a large-scale document (e.g., a map, a navigation route, a spreadsheet, etc.) or related application 103 and thereafter cause, at least in part, a presentation corresponding to the mapped activity of the at least one UE 101.

In one embodiment, the positioning platform 109 causes, at least in part, sensory feedback through at least one UE 101 (e.g., the UE 101*a*) that may be auditory, visual, tactile, or a combination thereof. In another embodiment, the positioning platform 109 may process and/or facilitate a processing of contextual information associated with at least one UE 101 to cause, at least in part, a presentation, wherein the contextual information includes, at least in part, user profile information, user preference information, location information, temporal information, activity information, or a combination.

In one embodiment, the positioning platform 109 may cause at least one UE 101 (e.g., the UE 101*a*) to operate as a pointing device based, at least in part, on detecting that the mobile communication device is on or slightly above a flat surface (e.g., the ground, a desk, a table, etc.). Further, the positioning platform 109 may determine one or more interactions, one or more positions, or a combination thereof associated with the UE 101*a*, wherein the one or more interactions include, at least in part, one or more movement-based interactions, gesture-based interactions, or a combination thereof.

In one embodiment, the positioning platform 109 may include or have access to a location database 111 to access or store any kind of data associated with a point of interest (POI), such as historical user information, location proximity information, temporal proximity information, contextual proximity information, etc. Data stored in the location database 111 may, for instance, be provided by the UEs 101, the services platform 113, the services 115, or one or more content providers 117*a*-117*p* (also collectively referred to as content providers 117). In one embodiment, the location database 111 may include an index of various locations. The positioning platform 109 can query the index based on a provided input from interacting with an application 103 via the UEs 101, for example. The one or more attributes associated with the location is then maintained by the index.

By way of example, the services platform 113 may include any type of service. For example, the services platform 113 may include mapping services, navigation services, social networking services, content provisioning services (e.g., text, images, etc.), application services, storage services, contextual information determination services, location-based services, information-based services (e.g., weather, news, etc.), etc. In one embodiment, the services platform 113 may interact with the UE 101, the positioning platform 109 and the content providers 117 to supplement or aid in the processing of the content information.

The content providers 117 may provide content to the UE 101, the positioning platform 109, and the services 115 of the services platform 113. The content provided may be any type of content, such as textual content, visual content, etc. In one embodiment, the content providers 117 may provide content that may supplement content of the applications 103, the sensors 105, or a combination thereof. By way of example, the content providers 117 may provide content that may aid in the processing of the location information associated with POIs to determine authentication of a service parameter. In one embodiment, the content providers 117 may also store content associated with the UEs 101, the positioning platform 109, and the services 115. In one embodiment, the content providers 117 may manage access to a central repository of data, and offer a consistent, standard interface to data, such as a repository of users' navigational data content. In another embodiment, the content providers 117 act as hosts of one or more websites, social networking services, blogs, advertising materials, review information, data feeds, or sources of other information and/or documents. By way of example, the information and/or published documents provided by the content providers 117 may feature data which may include frequency of visit to POIs, timely verification information with the service providers, default information, if any, associated with POI, etc.

By way of example, the UEs 101, the positioning platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
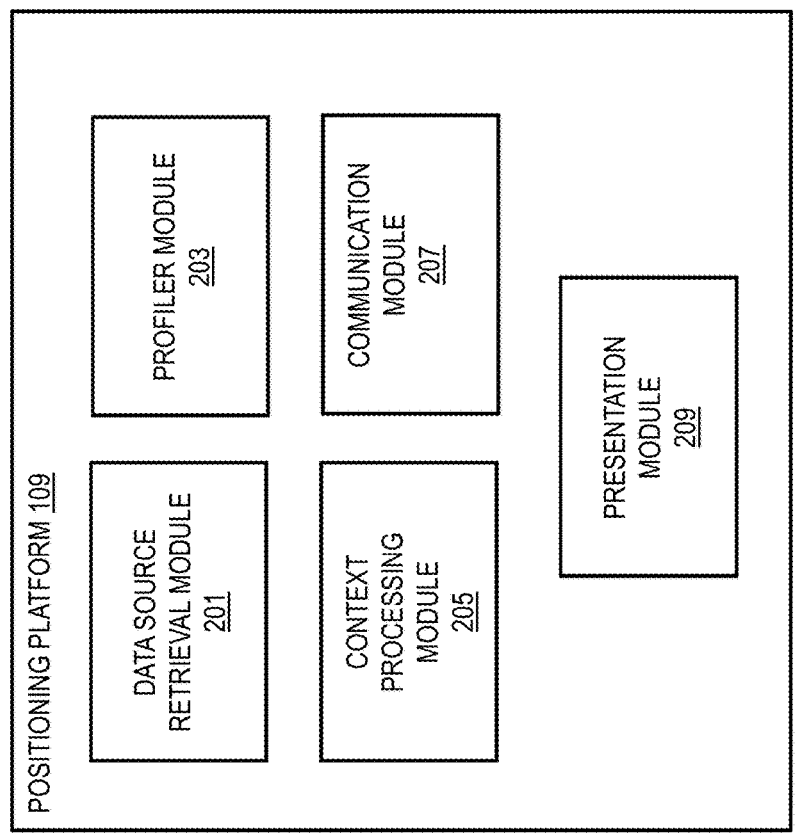
FIG. 2 is a diagram of the components of a positioning platform 109, according to one embodiment.
Figure 3:
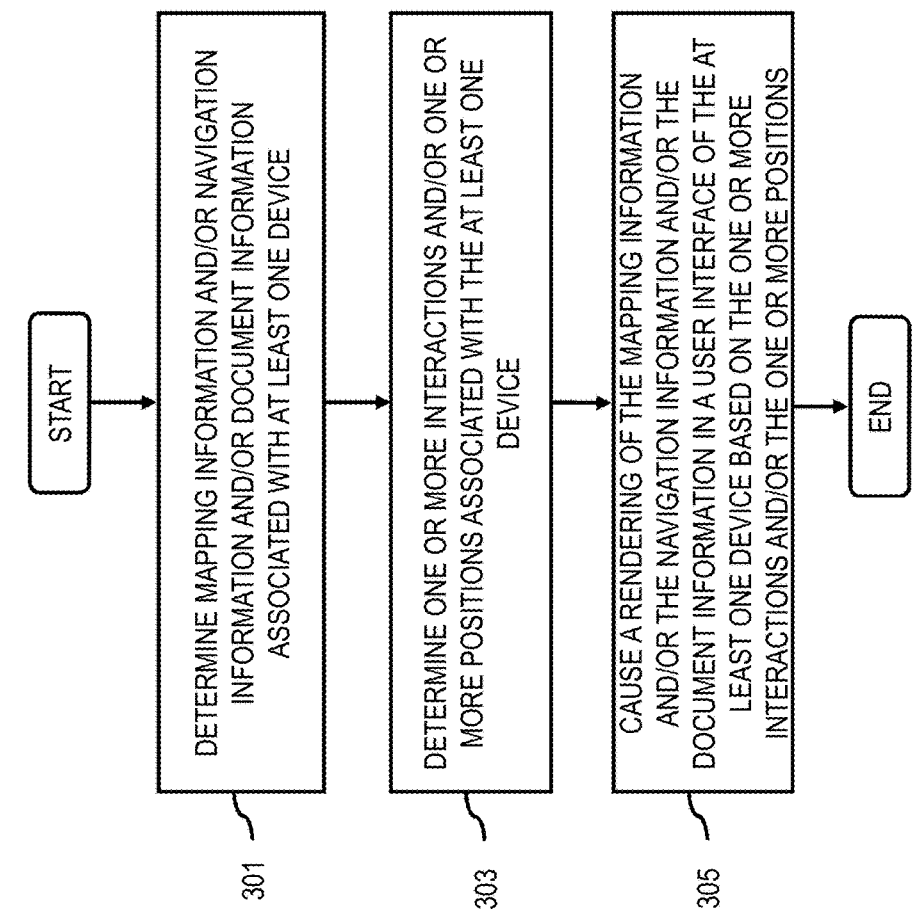
FIGS. 3-6 are flowcharts of processes for rendering and maneuvering about large-scale documents with a mobile device that features an integrated optical sensor and virtual display functions, according to one embodiment.

FIG. 2 is a diagram of the components of the positioning platform 109, according to one embodiment. By way of example, the positioning platform 109 includes one or more components for rendering and maneuvering about large-scale documents with a mobile device that features an integrated optical sensor and virtual display functions, according to one embodiment. It is contemplated that the functions of these components may be combined in one or more components or performed by other components of equivalent functionality. In this embodiment, the positioning platform 109 includes a data source retrieval module 201, a profiler module 203, a context information processing module 205, a communication module 207, and presentation module 209.

In one embodiment, a data source retrieval module 201 retrieves activity data as maintained by the UEs 101. The data source retrieval module 201 may be configured to perform on demand retrieval of the data or alternatively, periodic data exchange with the UEs 101. Data retrieval may be triggered by the positioning platform 109, such as in response to the detection of input generated by one or more of the sensors 105 of the UEs 101 (e.g., a microphone, a camera, antennas, a touch screen, etc.) As data is collected from multiple different modules of the UEs 101, the data can be stored with reference to a specific user or a UE 101 (e.g., the UE 101*a*).

In one embodiment, the profiler module 203 processes the one or more UEs 101 (e.g., the UE 101*a*) to determine profile information associated with at least one user, a UE 101, or a combination thereof. This is done, for example, in response to a request by a calling application 103 and/or service 115. By way of example, the profiler module 203 cross-references the positioning platform 109 to determine if at least one of the terms matches a term indicated in a user profile. Further, the profiler module 203 may operate in connection with the data source retrieval module 201 to enable updating of the profile information. As such, an application, service, or other executable process of the UE 101 may reference the profiler module 203 for carrying out various tasks.

In one embodiment, the context information processing module 205 receives context information as gathered by the sensors 105 of the UE 101*a*, the location database 111, the services 115, or a combination thereof. Once received, the context information processing module 205 analyzes the context information to determine relevant information, such as, location information, activity information, preference information etc. Based on this determination, the context information processing module 205 triggers execution of the communication module 207.

In one embodiment, a communication module 207 enables formation of a session over the communication network 107 between the positioning platform 109 and the services 115. By way of example, the communication module 207 executes various protocols and data sharing techniques for enabling collaborative execution between the UEs 101 and the positioning platform 109 over the communication network 107.

The presentation module 209 causes, at least in part, a presentation an application 103, upon receiving the data from the communication module 207. The presentation module 209 may utilize the location database 111 and/or services 115 to determine whether the information received is up to date. The presentation module 209 also may obtain a set of summary statistics from other modules. Then, the presentation module 209 continues with generating a presentation corresponding to the information received and can provide presentation data set where the presentation could be depicted in one or more visual display units.

The above presented modules and components of the positioning platform 109 can be implemented in hardware, firmware, software, or a combination thereof. Though depicted as a separate entity in FIG. 1, it is contemplated that the positioning platform 109 may be implemented within a UE 101. As such, the positioning platform 109 may generate direct signal inputs by way of the operating system of the UE 101 for interacting with an application 103. In another embodiment, one or more of the modules 201-209 may be implemented for operation by respective UEs 101, as the positioning platform 109, or combination thereof. Still further, the positioning platform 109 may be integrated for direct operation with services 115, such as in the form of a widget or applet, in accordance with an information and/or subscriber sharing arrangement. The various executions presented herein contemplate any and all arrangements and models.

Figure 10:
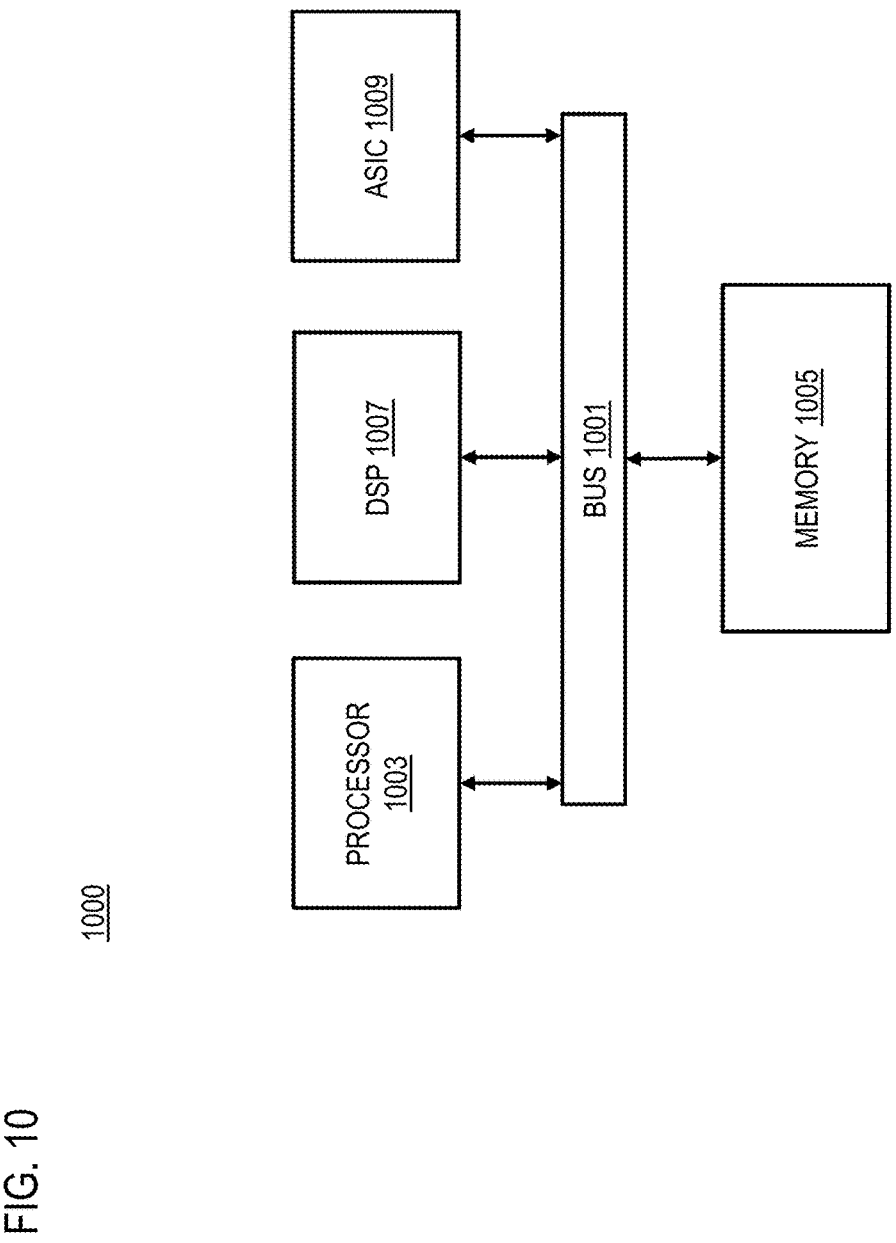
FIG. 10 is a diagram of a chip set that can be used to implement an embodiment of the invention.

FIG. 3-6 are flowcharts of a process for rendering and maneuvering about large-scale documents with a mobile device that features an integrated optical sensor and virtual display functions, according to one embodiment. In one embodiment, the positioning platform 109 performs the process 300 and is implemented in, for instance, a chip set including a processor and a memory as shown in FIG. 10.

In step 301, the positioning platform 109 determines mapping information, navigation information, document information, or a combination thereof associated with at least one device. In one scenario, the positioning platform 109 causes, at least in part, a configuration of the at least one UE 101 as a pointing device and/or a display device for the at least one UE 101 based, at least in part, on a request from the at least one UE 101, wherein the request specifies an event corresponding to one or more sensors of the at least one UE 101. The positioning platform 109 then causes a mapping by the at least one UE 101 for determination of required information associated with the at least one UE 101.

In step 303, the positioning platform 109 determines one or more interactions, one or more positions, or a combination thereof associated with the at least one device, wherein the one or more interactions include, at least in part, at least one or more movement, one or more gesture-based interactions, or a combination thereof. In one embodiment, the positioning platform 109 determines an input for specifying at least one panning operation over a user interface. In one scenario, a mobile communication device may provide an alternate display which the user may interact with. The user interface may provide smoother text scanning and no finger obstruction of having to continually grab the screen while trying to read.

In step 305, the positioning platform 109 causes, at least in part, a rendering of the mapping information, the navigation information, the document information, or a combination thereof in a user interface of the at least one device based, at least in part, on the one or more interactions, the one or more positions, or a combination thereof. In one scenario, the positioning platform 109 causes, at least in part, a presentation by the at least one UE 101, the content provided by at least one UE 101 according to the mapped activity. In one scenario, the positioning platform may cause at least in part, a presentation of the content in an augmented reality user interface.

Figure 4:
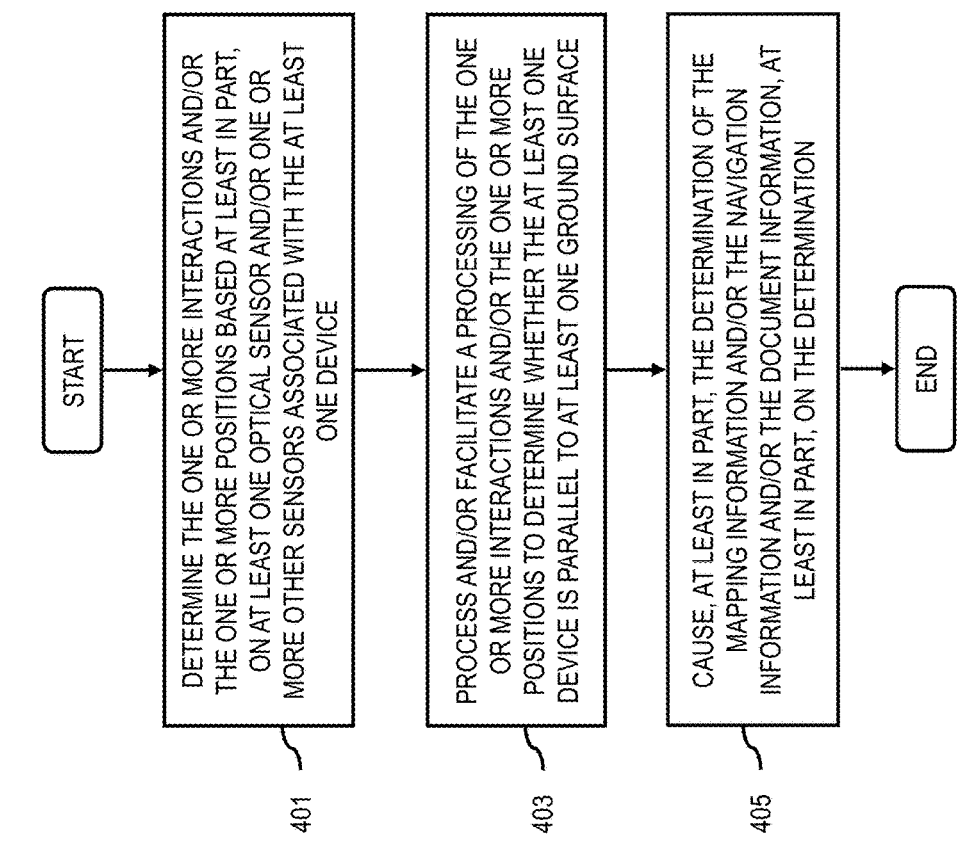

FIG. 4 is a flowchart of a process for causing, at least in part, a rendering of the mapping information, the navigation information, the document information, or a combination thereof in a user interface of the at least one device based, at least in part, on the one or more interactions, the one or more positions, or a combination thereof, according to one embodiment. In one embodiment, the positioning platform 109 performs the process 400 and is implemented in, for instance, a chip set including a processor and a memory as shown in FIG. 10.

In step 401, the positioning platform 109 determines the one or more interactions, the one or more positions, or a combination thereof based, at least in part, on at least one optical sensor, one or more other sensors, or a combination thereof associated with the at least one device. In one scenario, a user may use a personal computer to plan a route, as soon as UE 101 is configured to the personal computer, the positioning platform 109 may determine the route for the user and may display the required information as a virtual display on the user interface of UE 101.

In step 403, the positioning platform 109 processes and/or facilitates a processing of the one or more interactions, the one or more positions, or a combination thereof to determine whether the at least one device is parallel to at least one ground surface. In one scenario, a user may put the UE 101 on a table, the positioning platform 109 may cause the UE 101 to function as a pointing device upon detecting that the UE 101 is on a flat surface.

In step 405, the positioning platform 109 causes, at least in part, the determination of the mapping information, the navigation information, the document information, or a combination thereof based, at least in part, on the determination. In one scenario, UE 101 may function as a pointing device with graphic display, audio, and vibration features upon detecting that it has been placed on a flat surface. In one scenario, if a user views a map on his personal computer, with his UE 101 on the table, such action may prompt the UE 101 to operate as a pointing device with display functions. The UE 101 may update its display with POI information as the user moves the UE 101 over each POI icon on the map. Further, the UE 101 may display user defined GUI buttons to dial the POI.

Figure 5:
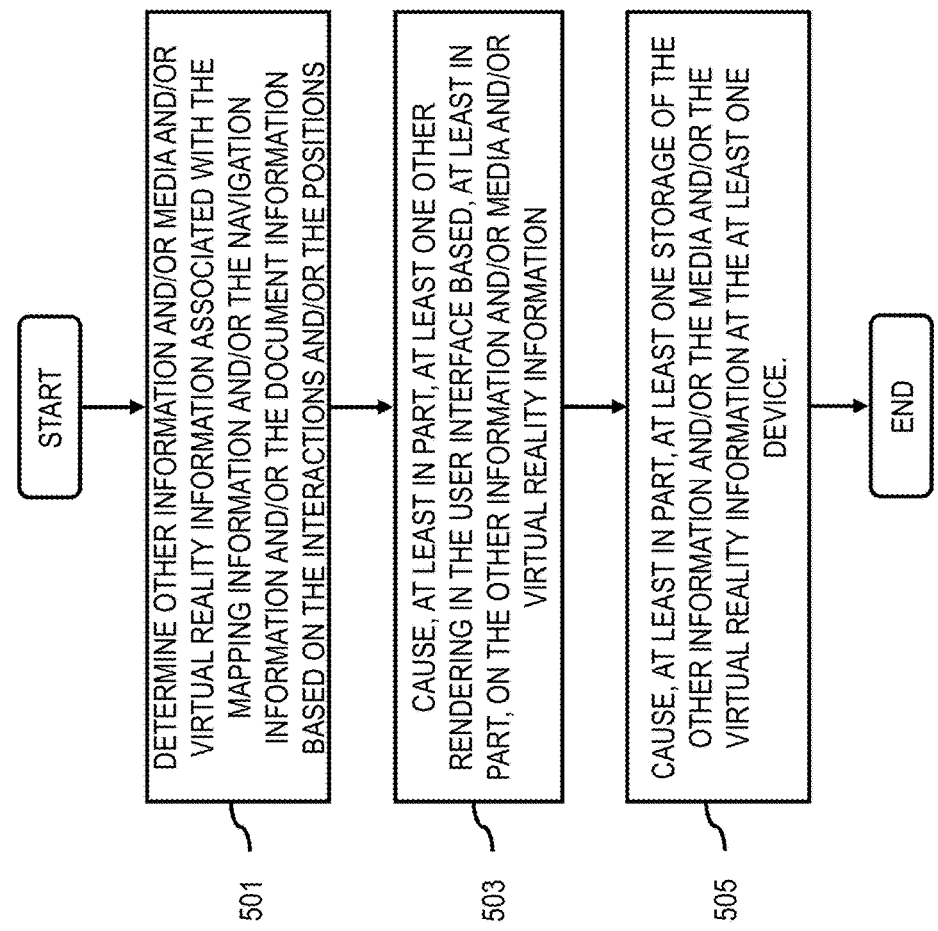

FIG. 5 is a flowchart of a process for determining other information, media, virtual reality information, or a combination thereof associated with the mapping information, the navigation information, the document information, or a combination thereof based, at least in part, on the one or more interactions, the one or more positions, or a combination thereof, according to one embodiment. In one embodiment, the positioning platform 109 performs the process 500 and is implemented in, for instance, a chip set including a processor and a memory as shown in FIG. 10.

In step 501, the positioning platform 109 determines other information, media, virtual reality information, or a combination thereof associated with the mapping information, the navigation information, the document information, or a combination thereof based, at least in part, on the one or more interactions, the one or more positions, or a combination thereof. In one scenario, network link is caused over a wireless local area network between UE 101 and the at least one UE 101, wherein the positioning platform 109 of UE 101 renders the one or more representation of the determined information associated with the mapping information and/or navigation information and/or document information of the at least one UE 101. In one scenario, a user may pan large documents using UE 101, which features an integrated optical sensor. Consequently, the UE 101 may display the document information based, at least in part, on the position of the pointer in the document. In one scenario, the UE 101 may zoom in out of the document and/or access links or objects displayed within the document based, at least in part, on the one or more interaction (e.g., user clicking a GUI button that reads "zoom in"). In one scenario, the positioning platform 109 may display contextual information or dynamic menus based on interaction with the connected computer.

In step 503, the positioning platform 109 causes, at least in part, at least one other rendering in the user interface based, at least in part, on the other information, the media, the virtual reality information, or a combination thereof. In one embodiment, the positioning platform 109 determines one or more interactions with the user interface, the virtual display, the one or more representations, or a combination thereof. In one scenario, the positioning platform 109 may process contextual information associated with at least one UE 101, wherein the contextual information may include, at least in part, user profile information, user preference information, location information, temporal information, activity information, or a combination. In one use case, the positioning platform 109 may determine to render a presentation (e.g., POI) to represent the user interest while scanning mapping information based, at least in part, on the other information and/or the media and/or the virtual reality information.

In step 505, the positioning platform 109 causes, at least in part, at least one storage of the other information, the media, the virtual reality information, or a combination thereof at the at least one device. In one embodiment, the positioning platform 109 may manage access to such stored data, and offer a consistent, standard interface to data, such as a repository of UE 101's displayed contents.

Figure 6:
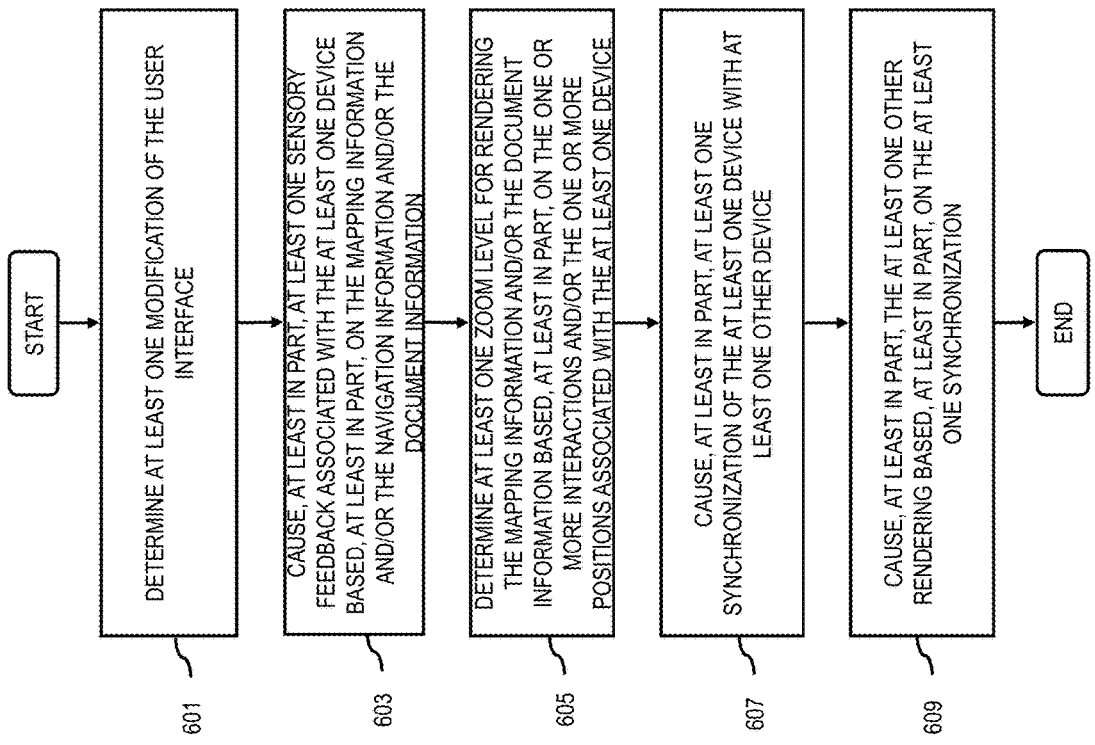

FIG. 6 is a flowchart of a process for determining at least one modification of the user interface. In one embodiment, the positioning platform 109 performs the process 600 and is implemented in, for instance, a chip set including a processor and a memory as shown in FIG. 10.

In step 601, the positioning platform 109 determines at least one modification of the user interface, wherein the rendering of the mapping information, the navigation information, the document information, or a combination thereof is based, at least in part, on the at least one modification. In one embodiment, the at least one modification of the user interface may be based, at least in part, on the one or more interactions, the one or more positions, or a combination thereof.

In step 603, the positioning platform 109 causes, at least in part, at least one sensory feedback associated with the at least one device based, at least in part, on the mapping information, the navigation information, the document information, or a combination thereof. In one scenario, the sensory feedback provided by the positioning platform 109 may be one of auditory, visual, tactile, or a combination thereof.

In step 605, the positioning platform 109 determines at least one zoom level for rendering the mapping information, the document information, or a combination thereof based, at least in part, on the one or more interactions, the one or more positions, or a combination thereof associated with the at least one device. In one scenario, the positioning platform 109 may cause UE 101 to smoothly navigate through large documents. Instead of tediously flicking the screen to peruse through a large document, the UE 101 may be used as a pointing device to navigate over a large document (e.g. using UE 101 as a magnifying glass to pan across a large document). Such function may avoid continuous side-to-side flicking to read new line in a large document that is wider than the phone screen.

In step 607, the positioning platform 109 causes, at least in part, at least one synchronization of the at least one device with at least one other device. In one scenario, the positioning platform 109 causes, at least in part, a configuration of the at least one UE 101 with the at least one UE 101 based, at least in part, on a request from the at least one UE 101 for using the UE 101 for pointing and virtual display purposes.

In step 609, the positioning platform 109 causing, at least in part, the at least one other rendering based, at least in part, on the at least one synchronization. In one scenario, the positioning platform 109 may cause a presentation of the determined information associated with the at least one UE 101 in a user interface of UE 101 upon determining the required information, such determination is based, at least in part, on the proper synchronization.

Figure 7A:
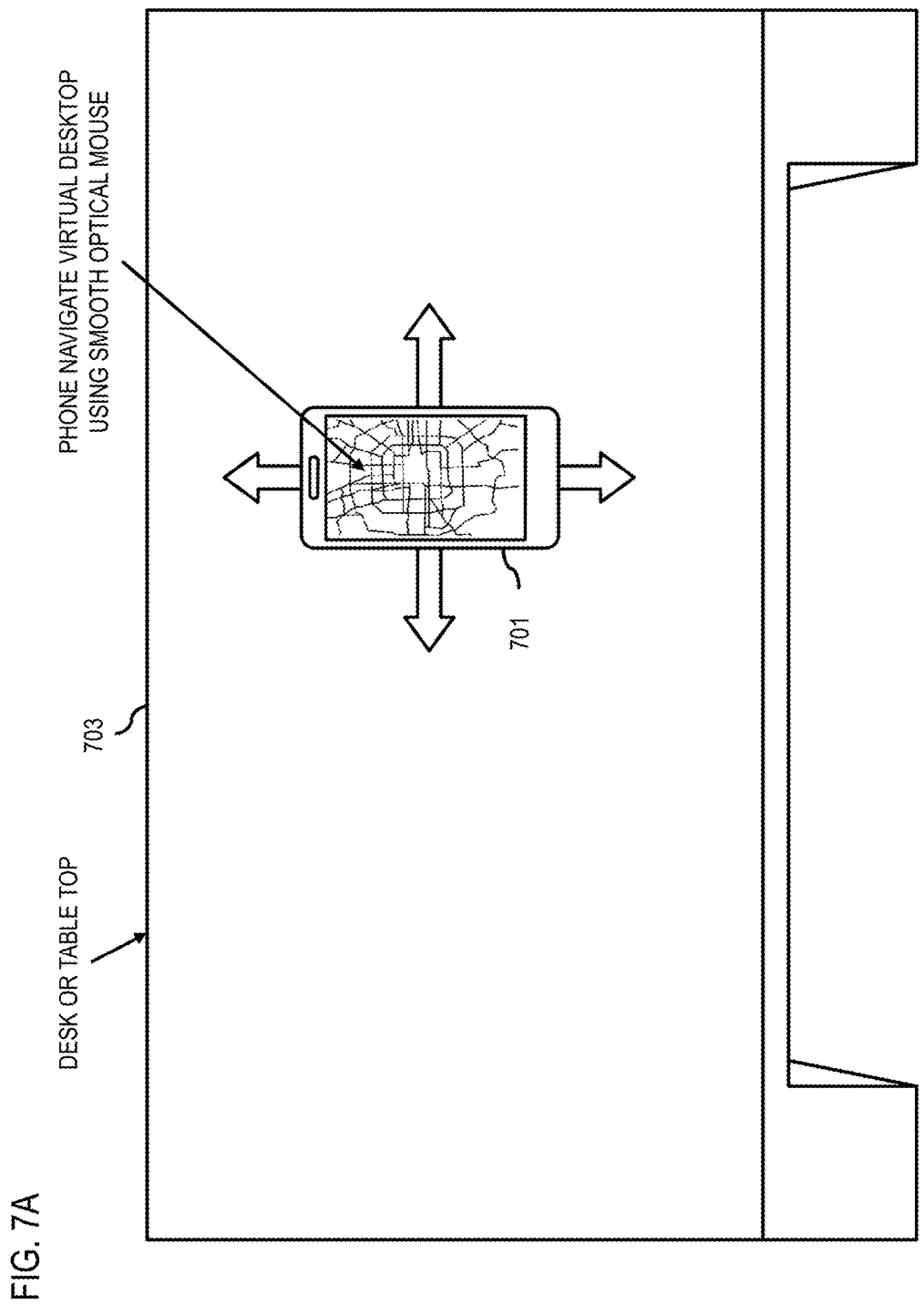
FIG. 7a-7c are diagrams of user interfaces utilized in the processes of FIGS. 3-6, according to various embodiments.
Figure 7B:
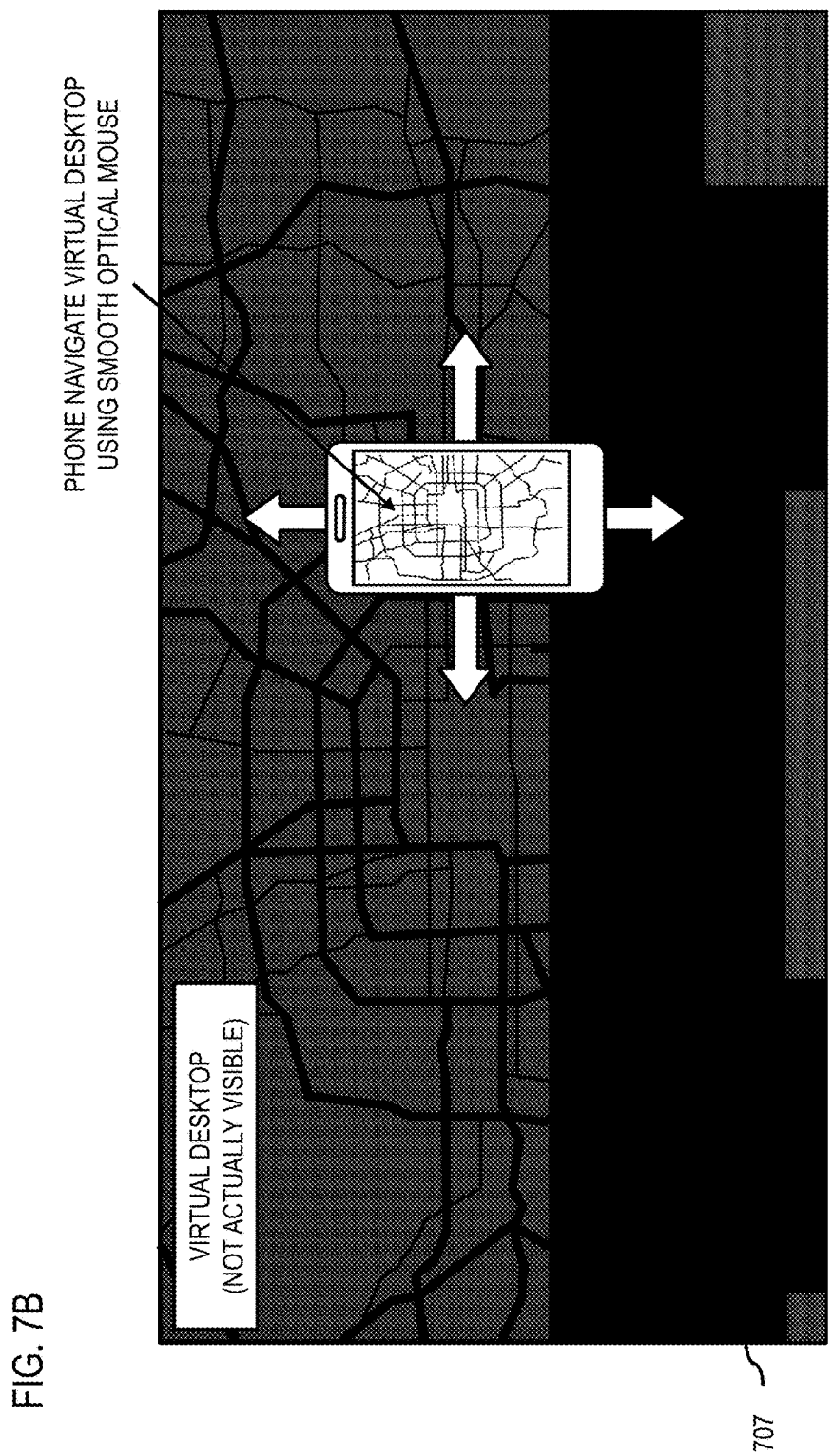
Figure 7C:
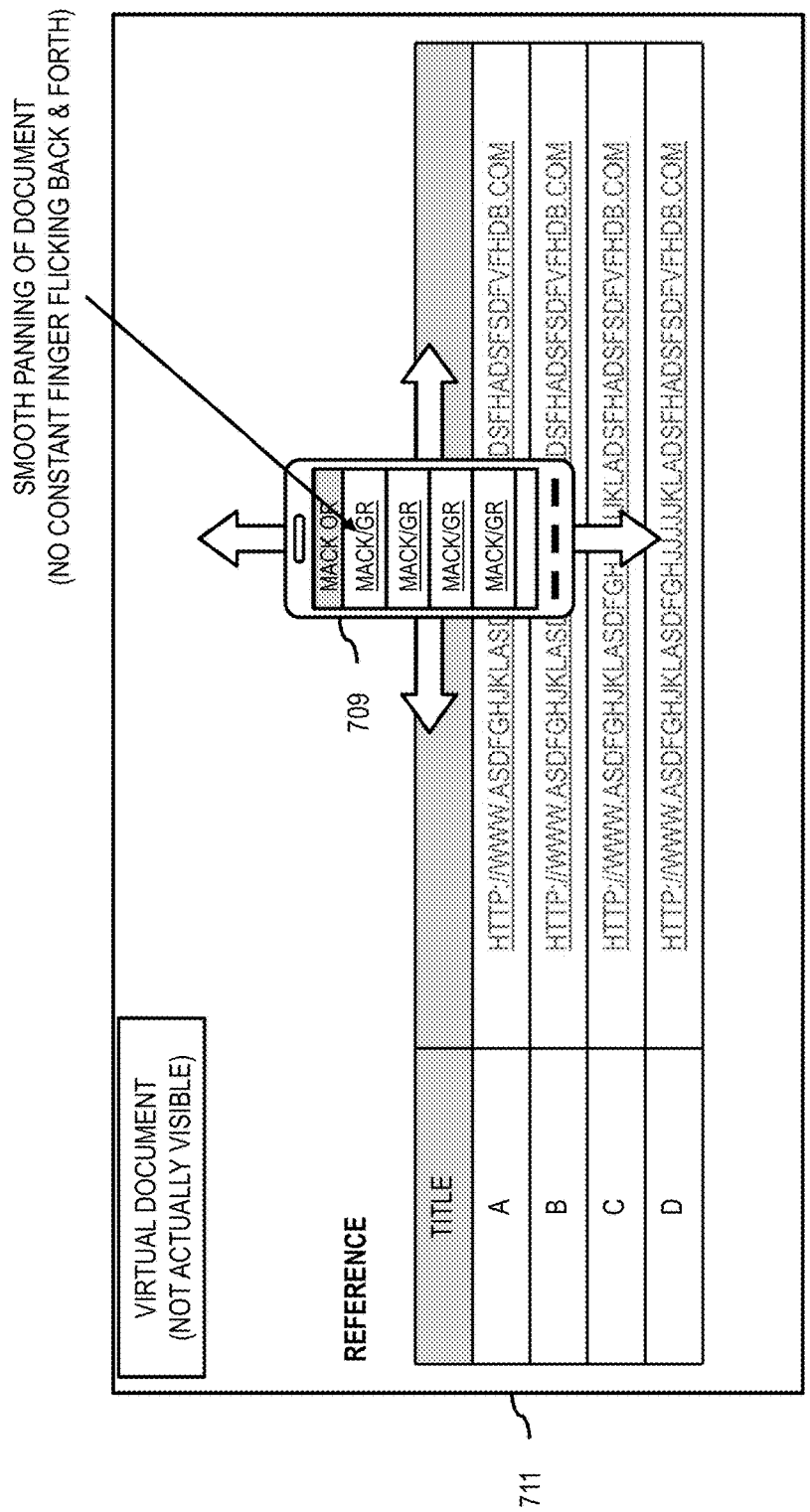

FIGS. 7A-7C are diagrams of user interfaces utilized in the processes of FIGS. 3-6, according to various embodiments. As shown, the example user interfaces of FIGS. 7A-7C include one or more user interface elements and/or functionalities created and/or modified based, at least in part, on information, data, and/or signals resulting from the processes (e.g., processes 300-600) described with respect to FIGS. 3-6. More specifically, FIG. 7A illustrates a user interface (e.g., interface 701) (e.g., a mobile phone) on or slightly above a flat surface such as a desk 703. In one embodiment, a user can pan large-scale documents (e.g., maps, navigation routes, spreadsheet, etc.) using the interface 701, which features an integrated optical sensor. Consequently, the user is not forced to gesture across the display of the interface 701 to pan the document as commonly required to view such documents. In this example use case, the display of the interface 701 can instead be used by the user to zoom in out of the document and/or access links or objects displayed within the document (e.g., contact information related to a POI). FIG. 7B illustrates a user interface (e.g., interface 705) and a virtual desktop 707. Similar to example use case illustrated in FIG. 7A, this example use case also allows a user to pan or move the interface 705 across a virtual surface 707 to explore a large-scale document (e.g., a map). FIG. 7C similarly illustrates a user interface 709 associated with a spreadsheet or database 711. In one embodiment, it is contemplated that the functionality of all three interfaces (e.g., interface 701, 705, and 709) are the same.

Figure 8:
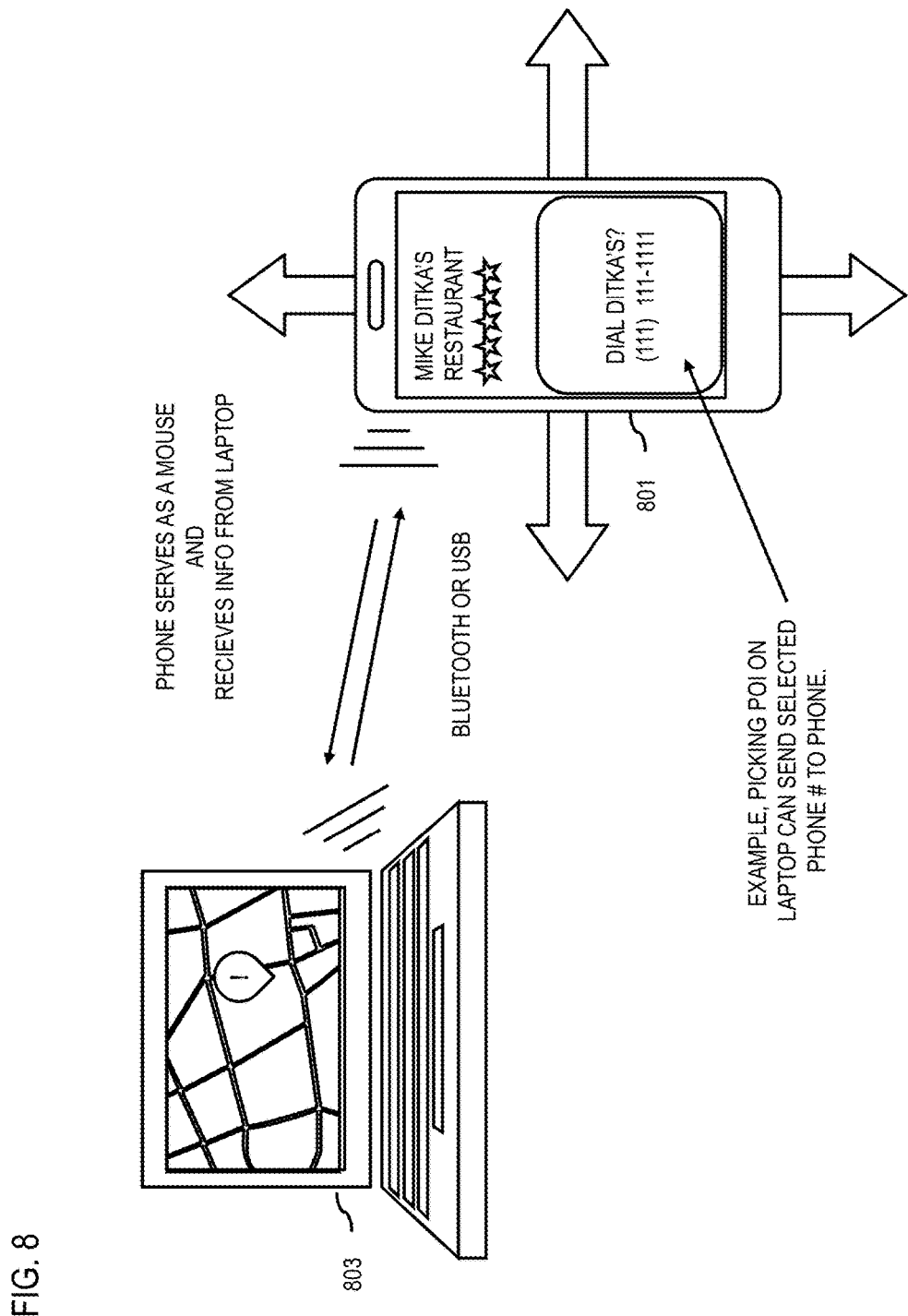
FIG. 8 is a diagram of user interfaces utilized in the processes of FIGS. 3-6, according to various embodiments.

FIG. 8 is a diagram of user interfaces utilized in the processes of FIGS. 3-6, according to various embodiments. As shown, the example user interfaces of FIG. 8 include one or more user interface elements and/or functionalities created and/or modified based, at least in part, on information, data, and/or signals resulting from the processes (e.g., processes 300-600) described with respect to FIGS. 3-6. More specifically, FIG. 8 illustrates two user interfaces (e.g., interfaces 801 and 803) (e.g., a mobile phone and a personal computer, respectively). In one embodiment, the interface 801 may be used as a pointing device as well as a display device. In one scenario, the interface 801 may display a customized user interface. The interface may have 'fixed buttons' added to the display for specific features, such as, 'delete' and/or 'start application', etc. or it may have 'dynamic or context aware buttons' added to the display based on the items the user is viewing on other mobile communication devices. For instance, the interface 801 may automatically display the 'context menu' (i.e., the menu that shows up when selecting the right button of a standard mouse when hovering over any files or icon on the display screen of the interface 803. In one scenario, the interface 801 may provide a magnified view of the display of the interface 803 based, at least in part, on the placing of a corresponding cursor on the screen of the interface 801. In one scenario, a user may view a map on the interface 803 and the interface 801 may provide a display of the contextual information for the selected map, such as POIs, contact information, etc. Moreover, additional feature may include allowing the interface 801 to directly use the contact information associated with a POI (e.g., a phone number). In one scenario, while a user views a two dimensional display on the interface 803, the interface 801 may display 360° street imagery of the selected location on the map, or vice versa. In another scenario, a user may view a map on the interface 803 and the interface 801 can display an aerial imagery of the selected location as a display.

The processes described herein for rendering and maneuvering about large-scale documents with a mobile device that features an integrated optical sensor and virtual display functions may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
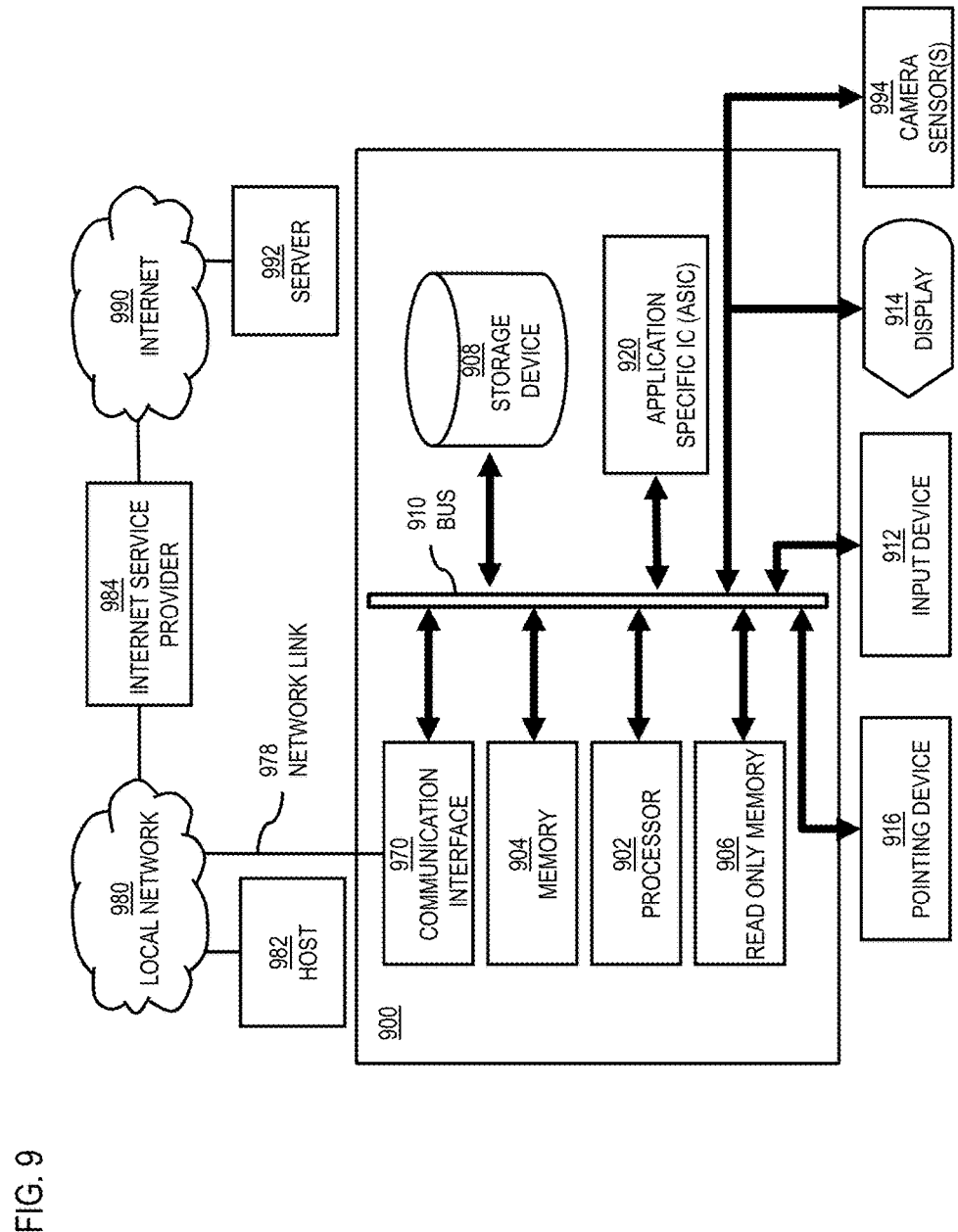
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to render and maneuver about large-scale documents with a mobile device that features an integrated optical sensor and virtual display functions as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of rendering and maneuvering about large-scale documents with a mobile device that features an integrated optical sensor and virtual display functions.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to render and maneuver about large-scale documents with a mobile device that features an integrated optical sensor and virtual display functions. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for rendering and maneuvering about large-scale documents with a mobile device that features an integrated optical sensor and virtual display functions. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for rendering and maneuvering about large-scale documents with a mobile device that features an integrated optical sensor and virtual display functions, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for rendering and maneuvering about large-scale documents with a mobile device that features an integrated optical sensor and virtual display functions to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to render and maneuver about large-scale documents with a mobile device that features an integrated optical sensor and virtual display functions as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of rendering and maneuvering about large-scale documents with a mobile device that features an integrated optical sensor and virtual display functions.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to render and maneuver about large-scale documents with a mobile device that features an integrated optical sensor and virtual display functions. The memory 1005 also stores the data associated with or generated by the execution of the inventive steps.

Figure 11:
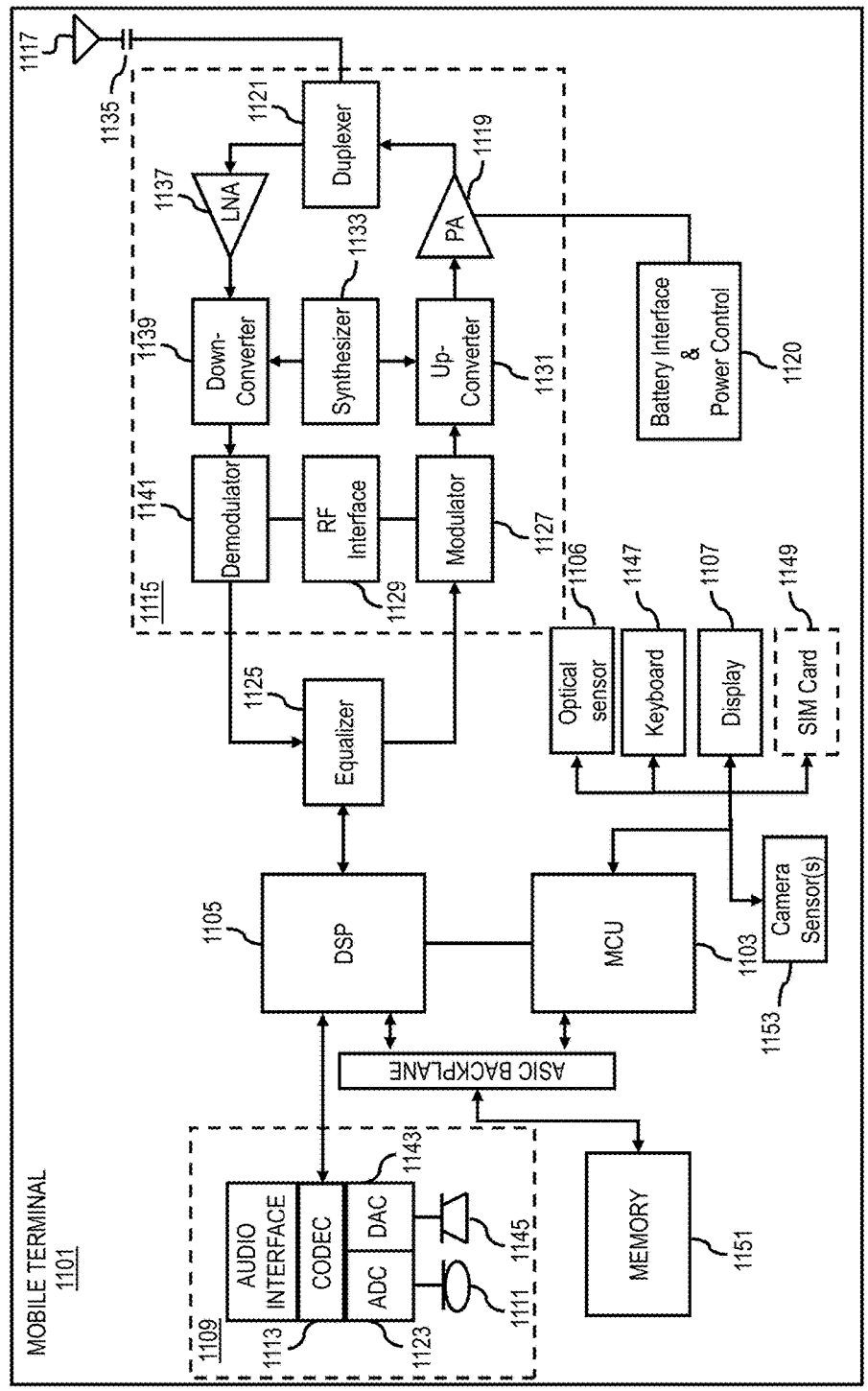
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of rendering and maneuvering about large-scale documents with a mobile device that features an integrated optical sensor and virtual display functions. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. The optical sensor 1106 performs the steps of a rendering and maneuvering about large-scale documents and causes a rendering of the mapping information, the navigation information, the document information, or a combination thereof in a user interface of the at least one device based, at least in part, on the one or more interactions, the one or more positions, or a combination thereof. A main display unit 1107 provides a display to the user in support of various applications and mobile terminal functions that perform or support the steps of rendering and maneuvering about large-scale documents with a mobile device that features an integrated optical sensor and virtual display functions. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to render and maneuver about large-scale documents with a mobile device that features an integrated optical sensor and virtual display functions. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for rendering geographic mapping information, the method comprising:
   determining, utilizing at least one interface, a large-scale document associated with at least one mobile device, wherein the determined large-scale document includes mapping information, navigation information, document information or a combination thereof;

determining, utilizing at least one processor, a virtual surface associated with the determined large-scale document,
wherein the determined virtual surface includes geographic mapping information of the large-scale document for active display within a user viewing interface of the mobile device and other geographic mapping information of the determined large-scale document that is not actively displayed within the user viewing interface;

determining one or more interactions with a physical surface, utilizing at least one optical sensor associated with the at least one mobile device to generate optical data gathered by the optical sensor;

mapping the determined one or more interactions with the physical surface with respect to the determined virtual surface;

determining at least part of the other geographic mapping information to become actively displayed within the user viewing interface based on the determined one or more interactions with the physical surface, the mapping and from the optical data gathered by the optical sensor generated through the interactions with the physical surface,
wherein the determined one or more interactions include, at least in part, at least one movement of the at least one device with respect to the physical surface for presenting the other geographic mapping information in the user viewing interface; and rendering the determined at least part of the other geographic mapping information in the user viewing interface of the at least one mobile device based, at least in part, on the mapped one or more interactions.

2. A method of claim 1, further comprising:
determining the one or more interactions based, at least in part, on one or more other sensors associated with the at least one device.

3. A method of claim 2, wherein the one or more interactions pan the virtual surface to present, in the user interface, a newly rendered portion of the virtual surface as the geographic mapping information.

4. A method of claim 1, further comprising:
processing the one or more interactions to determine whether the at least one device is approximately parallel to the physical surface; and
determining the geographic mapping information based, at least in part, on the determination of whether the at least one device is approximately parallel to the physical surface.

5. A method of claim 1, further comprising:
determining other information, media, or a combination thereof associated with the geographic mapping information based, at least in part, on the one or more interactions; and
at least one other rendering in the user interface based, at least in part, on the other information, the media, or a combination thereof.

6. A method of claim 5, further comprising:
at least one storage of the other information, the media, the virtual display information, or a combination thereof at the at least one device.

7. A method of claim 1, further comprising:
determining at least one modification of the user interface, wherein the rendering of the geographic mapping information is based, at least in part, on the at least one modification.

8. A method of claim 1, further comprising:
at least one sensory feedback associated with the at least one device based, at least in part, on the geographic mapping information.

9. A method of claim 1, further comprising:
determining at least one zoom level for rendering the geographic mapping information based, at least in part, on the one or more interactions associated with the at least one device.

10. A method of claim 1, further comprising:
at least one synchronization of the at least one device with at least one other device; and
at least one other rendering based, at least in part, on the at least one synchronization.

11. An apparatus for rendering geographic mapping information, the apparatus comprising:
at least one processor; and
at least one memory including computer program code for one or more programs,
the at least one memory and the computer program code configured to, with the at least one processor, cause the apparatus to perform at least the following,
determine, utilizing at least one interface, a large-scale document associated with at least one mobile device,
wherein the determined large-scale document includes mapping information, navigation information, document information or a combination thereof,
determine, utilizing the at least one processor, a virtual surface associated with the determined large-scale document,
wherein the determined virtual surface includes geographic mapping information of the large-scale document for active display within a user viewing interface of the mobile device and other geographic mapping information of the determined large-scale document that is not actively displayed within the user viewing interface,
determine one or more interactions with a physical surface, utilizing at least one optical sensor associated with the at least one mobile device to generate optical data gathered by the optical sensor,
map the determined one or more interactions with the physical surface with respect to the determined virtual surface,
determine at least part of the other geographic mapping information to become actively displayed within the user viewing interface based on the determined one or more interactions with the physical surface, the mapping and from the optical data gathered by the optical sensor generated through the interactions with the physical surface,
wherein the determined one or more interactions include, at least in part, at least one movement of the at least one device with respect to the physical surface for presenting the other geographic mapping information in the user viewing interface, and
render the determined at least part of the other geographic mapping information in the user viewing interface of the at least one mobile device based, at least in part, on the mapped one or more interactions.

12. An apparatus of claim 11, wherein the apparatus is further caused to:

determine the one or more interactions based, at least in part, on one or more other sensors associated with the at least one device.

13. An apparatus of claim 12, wherein the one or more interactions pan the virtual surface to present, in the user interface, a newly rendered portion of the virtual surface as the geographic mapping information.

14. An apparatus of claim 11, wherein the apparatus is further caused to:
 process and/or facilitate a processing of the one or more interactions to determine whether the at least one device is approximately parallel to the physical surface, and
 cause, at least in part, the determination of the geographic mapping information based, at least in part, on the determination of whether the at least one device is approximately parallel to the physical surface.

15. An apparatus of claim 11, wherein the apparatus is further caused to:
 determine other information, media or a combination thereof associated with the geographic mapping information based, at least in part, on the one or more interactions, and
 cause, at least in part, at least one other rendering in the user interface based, at least in part, on the other information, the media or a combination thereof.

16. An apparatus of claim 15, wherein the apparatus is further caused to:
 cause, at least in part, at least one storage of the other information, the media, the virtual display information, or a combination thereof at the at least one device.

17. An apparatus of claim 11, wherein the apparatus is further caused to:
 determine at least one modification of the user interface, wherein the rendering of the geographic mapping information, is based, at least in part, on the at least one modification.

18. An apparatus of claim 11, wherein the apparatus is further caused to:
 cause, at least in part, at least one sensory feedback associated with the at least one device based, at least in part, on the geographic mapping information.

19. An apparatus of claim 11, wherein the apparatus is further caused to:
 determine at least one zoom level for rendering the geographic mapping information based, at least in part, on the one or more interactions associated with the at least one device.

20. An apparatus of claim 11, wherein the apparatus is further caused to:
 cause, at least in part, at least one synchronization of the at least one device with at least one other device, and
 cause, at least in part, at least one other rendering based, at least in part, on the at least one synchronization.

\* \* \* \* \*